US012789727B2

(12) United States Patent
Rogers

(10) Patent No.: US 12,789,727 B2
(45) Date of Patent: Nov. 10, 2026

(54) CHARGEABLE STORAGE FOR ACCESSORY IDENTIFICATION AND CONTROL

(71) Applicant: Polaris Industries Inc., Medina, MN (US)

(72) Inventor: Madeline C. Rogers, Fall Creek, WI (US)

(73) Assignee: Polaris Industries Inc., Medina, MN (US)

( * ) Notice: Subject to any disclaimer, the term of this patent is extended or adjusted under 35 U.S.C. 154(b) by 0 days.

(21) Appl. No.: 18/688,391

(22) PCT Filed: Sep. 1, 2022

(86) PCT No.: PCT/US2022/075832
§ 371 (c)(1),
(2) Date: Mar. 1, 2024

(87) PCT Pub. No.: WO2023/034911
PCT Pub. Date: Mar. 9, 2023

(65) Prior Publication Data

US 2025/0018887 A1 Jan. 16, 2025

Related U.S. Application Data

(60) Provisional application No. 63/240,163, filed on Sep. 2, 2021.

(51) Int. Cl.
*B60R 16/033* (2006.01)
*B60K 35/10* (2024.01)
(Continued)

(52) U.S. Cl.
CPC ............ *B60R 16/033* (2013.01); *B60K 35/10* (2024.01); *B60K 35/22* (2024.01); *B60K 35/29* (2024.01);
(Continued)

(58) Field of Classification Search
CPC ... B60R 16/033; H02J 7/00032; H02J 7/0048; H02J 13/00001; H02J 1/14; H02J 7/0013; B60K 35/29; B60K 35/10; B60K 35/22
See application file for complete search history.

(56) References Cited

U.S. PATENT DOCUMENTS

| | | | | |
|---|---|---|---|---|
| 9,372,607 B1 | 6/2016 | Penilla | | |
| 2002/0158512 A1* | 10/2002 | Mizutani | ................ | B60R 11/02 307/9.1 |

(Continued)

FOREIGN PATENT DOCUMENTS

| | | | |
|---|---|---|---|
| AU | 2022339950 A1 | 3/2024 | |
| AU | 2022339950 B2 | 1/2026 | |

(Continued)

OTHER PUBLICATIONS

International Search Report and Written Opinion issued by the International Searching Authority, dated Nov. 23, 2022, for International Patent Application No. PCT/US2022/075832; 12 pages.

(Continued)

*Primary Examiner* — Carlos Amaya
(74) *Attorney, Agent, or Firm* — Merchant & Gould P. C.

(57) ABSTRACT

A vehicle is electrically connected to one or more removable accessories. The vehicle includes a user interface, an electrical power supply, a chargeable storage, and a controller. The controller may be configured to detect the one or more removable accessories that are connected to the at least one power outlet, determine an identifier associated with each of the one or more detected removable accessories, and cause the user interface to display one or more identifiers associated with the one or more detected removeable accessories.

20 Claims, 12 Drawing Sheets

(51) Int. Cl.

| | |
|---|---|
| ***B60K 35/22*** | (2024.01) |
| ***B60K 35/29*** | (2024.01) |
| ***H02J 1/14*** | (2026.01) |
| ***H02J 7/40*** | (2026.01) |
| ***H02J 7/50*** | (2026.01) |
| ***H02J 7/82*** | (2026.01) |
| ***H02J 13/10*** | (2026.01) |

(52) U.S. Cl.
CPC .................. *H02J 1/14* (2013.01); *H02J 7/40* (2026.01); *H02J 7/50* (2026.01); *H02J 7/82* (2026.01); *H02J 13/10* (2026.01)

(56) References Cited

U.S. PATENT DOCUMENTS

| | | | |
|---|---|---|---|
| 2015/0057916 A1 | 2/2015 | Ishii | |
| 2015/0193030 A1 | 7/2015 | Grover | |
| 2015/0293563 A1 | 10/2015 | Wharrad et al. | |
| 2019/0294173 A1* | 9/2019 | Szubbocsev | G05D 1/0274 |
| 2020/0198467 A1* | 6/2020 | Shaughnessy | B60P 1/6409 |
| 2020/0198561 A1 | 6/2020 | Weed et al. | |

FOREIGN PATENT DOCUMENTS

| | | | |
|---|---|---|---|
| CA | 3230228 | A1 | 3/2023 |
| CN | 117897295 | A | 4/2024 |
| EP | 4396019 | A1 | 7/2024 |
| EP | 4396019 | A4 | 8/2025 |
| JP | 2003011734 | A | 1/2003 |
| JP | 2010155525 | A | 7/2010 |
| JP | 2021112086 | A | 8/2021 |
| JP | 2024533056 | A | 9/2024 |
| MX | 2024002122 | A | 3/2024 |
| WO | WO-2023034911 | A1 | 3/2023 |

OTHER PUBLICATIONS

"Australian Application Serial No. 2022339950, First Examination Report mailed Jan. 20, 2025", 5 pgs.

"European Application Serial No. 22865798.7, Extended European Search Report mailed Jul. 16, 2025", 13 pgs.

"International Application Serial No. PCT/US2022/075832, International Preliminary Report on Patentability mailed Mar. 14, 2024", 12 pgs.

"Japanese Application Serial No. 2024-510682, Notification of Reasons for Refusal mailed Apr. 22, 2025", w/o English Translation, 10 pgs.

"Japanese Application Serial No. 2024-510682, Response filed Oct. 20, 2025 to Notification of Reasons for Refusal mailed Apr. 22, 2025", W/O English Claims, 8 pgs.

"Australian Application Serial No. 2022339950, Response filed Dec 9, 2025 to First Examination Report mailed Jan. 20, 2025", w/ English Claims, 58 pgs.

"European Application Serial No. 22865798.7, Response filed Jan. 29, 2026 to Extended European Search Report mailed Jul. 16, 2025", 25 pgs.

"European Application Serial No. 22865798.7, Response to Communication pursuant to Rules 161(1) and 162 EPC filed Oct. 8, 2024", 11 pgs.

"Japanese Application Serial No. 2024-510682, Appeal of an Adverse Decision—Overseas Applicant filed May 26, 2026", w/ English Translation, 16 pgs.

"Japanese Application Serial No. 2024-510682, Notification of Reasons for Refusal mailed Jan. 27, 2026", w/ English Translation, 7 pgs.

* cited by examiner

CHARGEABLE STORAGE FOR ACCESSORY IDENTIFICATION AND CONTROL

CROSS-REFERENCE TO RELATED APPLICATIONS

The present application is a national stage entry of International (PCT) Patent Application Number PCT/US2022/075832, filed Sep. 1, 2022, which claims priority to U.S. Provisional Application No. 63/240,163, filed Sep. 2, 2021, the complete disclosures of which are expressly incorporated herein by reference.

FIELD OF THE DISCLOSURE

The present disclosure relates to vehicles and accessories, and in particular to systems and methods for connecting accessories to a vehicle, controlling the connected accessories, and/or displaying the connected accessories on a user interface of the vehicle.

BACKGROUND OF THE DISCLOSURE

Generally, vehicles such as recreational vehicles ("RVs") and utility vehicles ("UVs") are used to carry one or more passengers and cargo from one location to another, sometimes used over a wide range of terrains and may be used on-road and/or off-road, such as trails. For example, systems and methods for displaying customized information regarding an RV are disclosed in U.S. Patent Application Publication No. 2017/0334500 (filed May 23, 2016, titled DISPLAY SYSTEMS AND METHODS FOR A RECREATIONAL VEHICLE), and systems and methods for identifying and controlling vehicle accessories based on accessory information of the RV are disclosed in U.S. Patent Application Publication No. 2020/0198561 (filed Sep. 4, 2019, titled MANAGING RECREATIONAL VEHICLES AND ACCESSORIES), the entire disclosures of which are expressly incorporated by reference herein.

Furthermore, RVs and UVs may offer exportable power to accessories, such as tools which may be used by the passengers. However, it is difficult for the passengers to identify which accessories are plugged into the vehicle if there are a plurality of such accessories being powered by the vehicle at the same time. Accordingly, there exists a need for one or more improved methods or systems in order to address one or more of the above-noted draw backs.

SUMMARY OF THE DISCLOSURE

As set forth above, embodiments provided herein relate to vehicle hazardous condition detection for a recreational vehicle. Exemplary embodiments include but are not limited to the following examples.

In one aspect, a vehicle includes a user interface, an electrical power supply configured to provide power to one or more removable accessories, a chargeable storage including at least one power outlet electrically coupled with the electrical power supply, each of the at least one power outlet configured to receive one of the one or more removable accessories to provide electrical power thereto, and a controller operatively coupled to the user interface, the electrical power supply, and the chargeable storage. The controller is configured to detect the one or more removable accessories that are connected to the at least one power outlet, determine an identifier associated with each of the one or more detected removable accessories, and cause the user interface to display one or more identifiers associated with the one or more detected removeable accessories.

In some embodiments, to determine the identifier associated with each of the one or more detected removable accessories may include causing the controller to receive, via the user interface, the identifier associated with each of the one or more detected removable accessories.

In some embodiments, the vehicle may further include at least one sensor configured to detect at least one of a state of charge of the electrical power supply or a power consumption for the electrical power supply when charging the one or more removable accessories. The controller may be further configured to determine, based on the state of charge of the electrical power supply, whether the state of charge of the electrical power supply is sufficient for the vehicle to arrive at a predetermined destination.

In some embodiments, the controller may be further configured to cause, in response to determination that the state of charge of the electrical power supply is not sufficient for the vehicle to arrive at the predetermined destination, the user interface to display a message alerting the user to turn off one or more of the at least one power outlet.

In some embodiments, the controller may be further configured to automatically turn off, in response to determination that the state of charge of the electrical power supply is not sufficient for the vehicle to arrive at the predetermined destination, one or more of the at least one power outlet.

In some embodiments, the at least one power outlet may be individually activatable and deactivatable by the user interface.

In some embodiments, the controller may be wirelessly coupled to a remote device, the remote device configured to display the user interface.

In some embodiments, the controller may be further configured to receive user input indicating at least one user priority from the user interface, receive sensor information from the at least one sensor, the sensor information including the state of charge of the electrical power supply or the power consumption for the electrical power supply when charging the one or more removable accessories, determine, based on the received sensor information and the at least one user priority, that one or more of the at least one power outlet needs to be deactivated, and cause the user interface to display a notification to deactivate the one or more of the at least one power outlet.

In some embodiments, the vehicle may further include an accessory current consumption sensor configured to detect a current consumption of each of the one or more removable accessories. The controller may be further configured to receive the current consumption, and determine a list of possible identifiers for the each of the one or more removable accessories by comparing the current consumption with one or more previously detected current consumptions.

In some embodiments, to determine the identifier associated with each of the one or more detected removable accessories may include to automatically select the identifier from the list of possible identifiers based on the current consumption.

In some embodiments, to determine the identifier associated with each of the one or more detected removable accessories may include to display the list of possible identifiers for the each of the one or more removable accessories on the user interface, and receive, via the user interface, the identifier from the list of possible identifiers.

In some embodiments, the controller may be further configured to determine a power consumption of charging the one or more removable accessories based on the current consumption, determine, based on the power consumption, that one or more of the at least one power outlet needs to be deactivated, and cause the user interface to display a notification to deactivate the one or more of the at least one power outlet.

In some embodiments, the chargeable storage may further include a storage lock that is activatable and deactivatable by the user interface.

In another aspect, a method for controlling charging of one or more removable accessories connected to an electrical power supply of a vehicle includes detecting the one or more removable accessories connected to at least one power outlet of a chargeable storage, the at least one power outlet coupled to the electrical power supply, each of the at least one power outlet configured to receive one of the one or more removable accessories to provide electrical power thereto, determining an identifier associated with each of the one or more detected removable accessories, and causing the user interface to display one or more identifiers associated with the one or more detected removeable accessories.

In some embodiments, determining the identifier associated with each of the one or more detected removable accessories may include receiving, via the user interface, the identifier associated with each of the one or more detected removable accessories.

In some embodiments, the method may further include determining whether the state of charge of the electrical power supply is sufficient for the vehicle to arrive at a predetermined destination, and in response to determining that the state of charge of the electrical power supply is not sufficient for the vehicle to arrive at the predetermined destination, at least one of (i) causing the user interface to display a message alerting the user to turn off one or more of the at least one power outlet, or (ii) automatically turning off one or more of the at least one power outlet.

In some embodiments, the method may further include receiving at least one user priority via the user interface, receiving a state of charge of the electrical power supply and power consumption for the electrical power supply by charging the one or more removable accessories, determining, based on the received sensor information and the at least one user priority, that one or more of the at least one power outlet needs to be deactivated, and causing the user interface to display a notification to deactivate the one or more of the at least one power outlet.

In some embodiments, the method may further include receiving the current consumption, and determining a list of possible identifiers for the each of the one or more removable accessories by comparing the current consumption with one or more previously detected current consumption, wherein the user selects the identifiers from the list.

In some embodiments, the method may further include determining a power consumption of charging the one or more removable accessories based on the current consumption, determining, based on the power consumption, that one or more of the at least one power outlet needs to be deactivated, and causing the user interface to display a notification to deactivate the one or more of the at least one power outlet.

In some embodiments, the at least one power outlet may be individually activatable and deactivatable by the user interface.

BRIEF DESCRIPTION OF THE DRAWINGS

The foregoing aspects and many additional features of the present system and method will become more readily appreciated and become better understood by reference to the following detailed description when taken in conjunction with the accompanying drawings, where.

DETAILED DESCRIPTION

Figure 1:
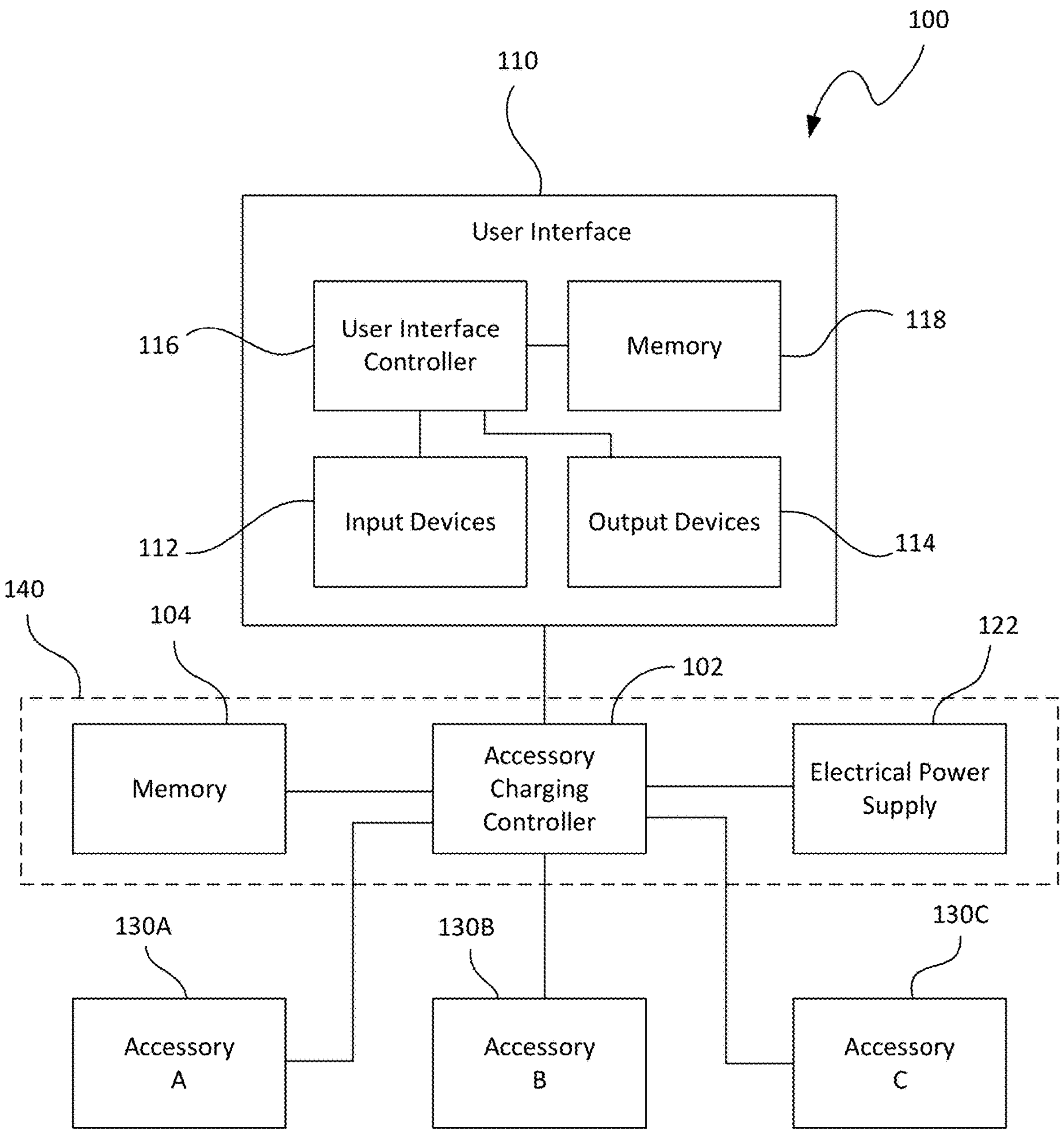
FIG. 1 is a representative view of an example vehicle.

For the purposes of promoting an understanding of the principles of the present disclosure, reference will now be made to the embodiments illustrated in the drawings. The embodiments disclosed below are not intended to be exhaustive or limited to the precise form disclosed in the detailed description. Rather, the embodiments are chosen as illustrative examples of the content described herein.

The terms "couples," "coupled," and variations thereof are used to include both arrangements wherein two or more components are in direct physical contact and arrangements wherein the two or more components are not in direct contact with each other (e.g., the components are "coupled" via at least a third component), but still cooperate or interact with each other.

Throughout the present disclosure and in the claims, numeric terminology, such as first and second, is used in reference to various components or features. Such use is not intended to denote an ordering of the components or features. Rather, numeric terminology is used to assist the reader in identifying the components or features being referenced and should not be narrowly interpreted as providing a specific order of components or features.

One of ordinary skill in the art will realize that the embodiments provided can be implemented in hardware, software, firmware, and/or a combination thereof. Programming code according to the embodiments can be implemented in any viable programming language such as C, C++, HTML, XTML, JAVA or any other viable high-level programming language, or a combination of a high-level programming language and a lower-level programming language.

FIG. 1 illustrates a block diagram of the components of a vehicle 100. Vehicle 100 may include, for example, a recreational vehicle (RV), a utility vehicle (UV), an electric vehicle (EV), a hybrid vehicle such as one with a motor and an internal combustion engine (ICE), or any other suitable type of vehicle which may benefit from these components. The vehicle 100 includes a controller, such as an accessory charging controller 102, having at least one associated memory 104. The accessory charging controller 102 provides electronic control of the various components of the vehicle 100, such as a user interface 110 and/or components of the user interface 110. In some examples, the accessory charging controller 102 forms a portion of a processing subsystem including one or more computing devices having memory, processing, and communication hardware. The accessory charging controller 102 may be a single device or a distributed device, and the functions of the accessory charging controller 102 may be performed by hardware and/or as computer instructions on a non-transient computer readable storage medium, such as memory 104.

The accessory charging controller 102 (e.g., an accessory control module) also interacts with a user interface 110, which includes at least one input device 112 and at least one output device 114. Example input devices 112 may include levers, buttons, switches, soft keys, selectors, knobs, inputs from frequency operated button (FOB). hard keys, and/or other suitable input devices. Example output devices 114 may include lights, displays, touchscreens, audio devices, tactile devices, and/or other suitable output devices. User interface 110 further includes a user interface controller 116 (which may also be referred to herein as a "interface controller" or "controller") and an associated memory 118. Interface controller 116 performs certain operations to control one or more subsystems of user interface 110 or of other vehicle components, such as one or more of input devices 112 and output devices 114. In some instances, interface controller 116 forms a portion of a processing subsystem including one or more computing devices having memory, processing, and/or communication hardware. The interface controller 116 may be a single device or a distributed device, and the functions of the interface controller 116 may be performed by hardware and/or as computer instructions on a non-transient computer readable storage medium, such as memory 118.

In some examples, output devices 114 may include a display and interface controller 116 may format information to be displayed on the display and cause the information to be displayed on the output device 114. In some variations, output devices 114 may include a touch display and interface controller 116 may format information to be displayed on the touch display, display the information, and monitor the touch display for user input. For example, interface controller 116 may interpret various types of touches to the touch screen display as inputs and control a content that is being displayed on the touch screen display. Example user inputs (e.g., types of touches) may include a touch, a drag, a swipe, a pinch, a spread, and/or other known types of gesturing.

Accessory charging controller 102 is operatively coupled to an electrical power supply 122. Electrical power supply 122 may be any type of electrical power supply, including a battery, a high voltage bus, stators, regulators, ferrous cores, solar components, and/or any type of alternative power methods and/or sources. Electrical power supply 122 provides power to operate the vehicle 100. Additionally, or alternatively, electrical power supply 122 is operatively coupled to user interface 110 (e.g., the user interface controller 116), a power system (not shown), and/or additional components of vehicle 100. For example, electrical power supply 122 may be electrically connected to components of vehicle 100 via a network, e.g., a vehicle bus and/or a controller area network (CAN).

Accessory charging controller 102 is also electrically coupled with one or more removable accessories, such as, for example, accessory A 130A, accessory B 130B, and accessory C 130C (collectively, accessories 130). As an example, an accessory that is removably coupled (e.g., electrically and/or mechanically) to vehicle 100 may be referred to as a removable accessory according to aspects described herein. Each of accessories 130 may have a different functionality or power level requirement (for example, electrical current and voltage limitations when charging). Although only three accessories are shown, any other number of accessories may be coupled with accessory charging controller 102, as suitable. Example accessories 103 may include, but are not limited to, one or more handheld electronic devices (e.g., cell phone, smart phone, satellite phone, personal gaming device), power tools, external batteries, battery chargers, electronic vehicle equipment, buildings, or the other devices having one or more components configured to operate using electricity.

Accessory charging controller 102 may communicate with the electrical power supply 122 and/or user interface 110. Additionally, or alternatively, accessory charging controller 102 may communicate directly and/or indirectly (e.g., through user interface controller 116) to components within user interface 110, such as the input devices 112, memory 118, and/or the output devices 114. Other example networks or other suitable data connections may be implemented in place of the CAN network and used to communicate between the entities and/or devices within vehicle 100 and controller 102. Accessory charging controller 102, memory 104, and electrical power supply 122 may be referred to collectively as an accessory charging system 140.

Figure 2:
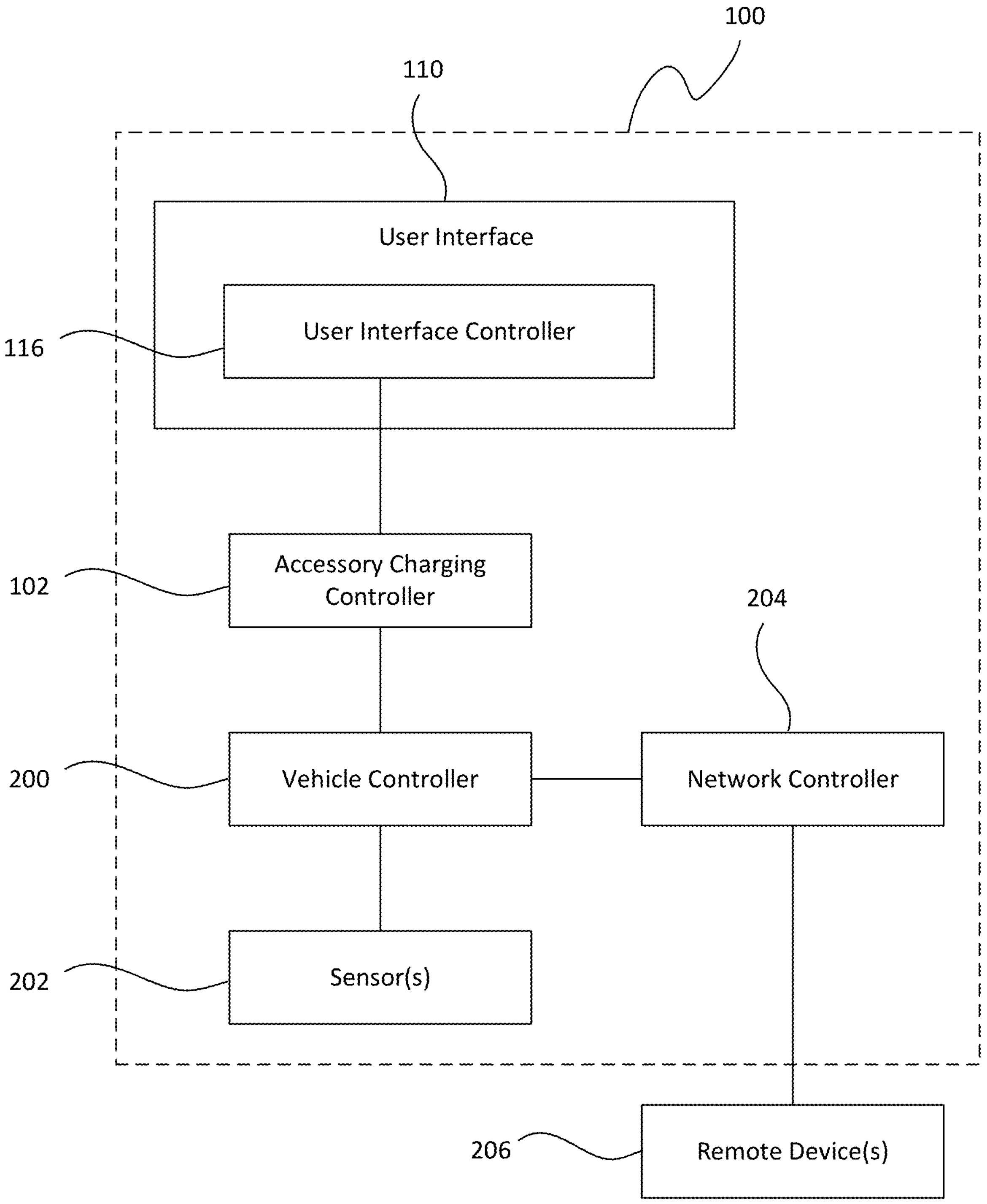
FIG. 2 is a representative view of example components of the vehicle of FIG. 1, including a vehicle controller.

FIG. 2 illustrates a block diagram further illustrating the components of vehicle 100. For example, vehicle 100 may include vehicle controller 200, such as an electronic control module, electrically coupled with the accessory charging controller 102. As discussed above in reference to FIG. 1, accessory charging controller 102 electrically coupled with user interface controller 116 of user interface 110. In some examples, accessory charging controller 102 may be included within vehicle controller 200. While not illustrated, additional controllers, such as a suspension controller, a steering system controller, and/or a power system controller, may be included within vehicle controller 200. Each of these controllers, including vehicle controller 200, may each be a single device or distributed device, or one or more of these controllers may together be part of a single device or distributed device. The functions of these controllers may be performed by hardware and/or as computer instructions on a non-transient computer readable storage medium, such as memory 104. Additionally. or alternatively, memory, such as memory 104, may be included within vehicle controller 200. In other words, the controllers within vehicle controller 200 may use memory 104 to store and/or retrieve information.

In some variations, vehicle controller 200 may include at least two separate controllers (e.g., a network controller and/or an accessory charging controller) that communicate over a network. In some instances, the network is a controller area network (CAN). In some variations, the CAN network may be implemented in accordance with the society of automotive engineers standard J1939 protocol. Details regarding an example CAN network are disclosed in U.S. patent application Ser. No. 11/218,163, filed Sep. 1, 2005, the entire contents of which is expressly incorporated by reference herein. Other example networks or other suitable data connections may be implemented in place of the CAN network. For example, in some embodiments, a two-wire serial communication may be used to communicate between the controllers.

In some examples, vehicle controller 200 may communicate with other devices and/or entities within vehicle 100 via a network, such as the CAN network described above. For example, vehicle controller 200 may communicate with one or more sensors 202, which may include any suitable sensor for detecting an operating condition of vehicle 100, for example an electrical power supply voltage sensor capable of detecting the state of charge of an energy storage device (e.g., electrical power supply 122) used in the vehicle 100 which may affect the charging capacity for accessories 130. In some examples, sensors 202 may include accessory power/current consumptions sensors(s) to detect a power usage, voltage drop, and/or current usage of connected accessories 130. In some examples, sensors 202 may include a vehicle speed sensor and/or an engine speed sensor to detect when the vehicle is moving, parked, or when the vehicle engine is turned off. The vehicle speed sensor provides information indicating a vehicle speed to the controller 116 via the controller 102. The vehicle speed sensor is any type of sensor that detects a vehicle speed of the vehicle 100. The engine speed sensor provides information indicating an engine speed (e.g., rotations per minute (RPM)) to user interface controller 116 via accessory charging controller 102. The engine speed sensor is any type of sensor that detects an engine speed of the engine (e.g., the rotational speed of the crankshaft of the engine). Other example networks or other suitable data connections may be implemented in place of the CAN network and used to communicate between the entities and/or device within vehicle 100 and controller 200.

In some examples, vehicle controller 200 may further be coupled with (or alternatively implement therein) a network controller 204 that controls communications between vehicle 100 and other devices through one or more network components (not shown). In some embodiments, network controller 204 of vehicle 100 may communicate with paired devices over a wireless network (e.g., via a wireless or Wi-Fi chip). An example wireless network may be a radio frequency network utilizing a BLUETOOTH protocol. In this example, the network components may include a radio frequency antenna. Network controller 204 may control the pairing of devices and/or servers to vehicle 100 and the communications between vehicle 100 and one or more remote devices 206. Additionally, or alternatively, network controller 204 may control and/or provide communication between multiple different vehicles (e.g., vehicle-to-vehicle communication). In some examples, network controller 204 may be communicatively coupled or directly coupled to user interface controller 116.

Example remote devices 206 may include, but are not limited to, a communication device (e.g., a mobile phone, smartphone, satellite telephones, and/or audio interface devices), near field communication devices (e.g., a personnel identification badge, a vehicle identification badge, or another device configured to emit or receive an RFID signal or the like), a server (e.g., a cloud computing server), a computing device (e.g., a laptop, desktop, tablet, and/or other personalized computers) and/or other devices capable of sending and receiving communications through external networks. For example, a server may connect a computing device to the network controller 204. In this way, network controller 204 may provide data to the server. Furthermore, based on the data, the cloud computing server may store the data. In some examples, the computing device may receive (e.g., obtain and/or retrieve) data from the server. Additionally, or alternatively, while not shown, the computing device may directly connect to network controller 204 via the network components to communicate with vehicle 100. In some examples, the server and vehicle 100 may be in communication with a communication device. In other words, the communication device may receive and/or transmit data from the server and/or vehicle 100.

In examples in which remote devices 206 include one or more audio interface devices, the audio interface devices may include a microphone to receive and convert an audio input to electronic signals and a speaker to convert electronic signals into an audio output. In some instances, the example communication devices may include one or more displays that display information, such as information regarding vehicle 100. Network controller 204 may provide instructions to the communication device to cause display of the vehicle information on the display screens of the communication device.

In some examples, vehicle controller 200 may further include a location determiner which determines a current location of recreational vehicle 100. An example location determiner is a GPS unit which determines the position of recreational vehicle 100 based on interaction with a global satellite system.

Figure 3:
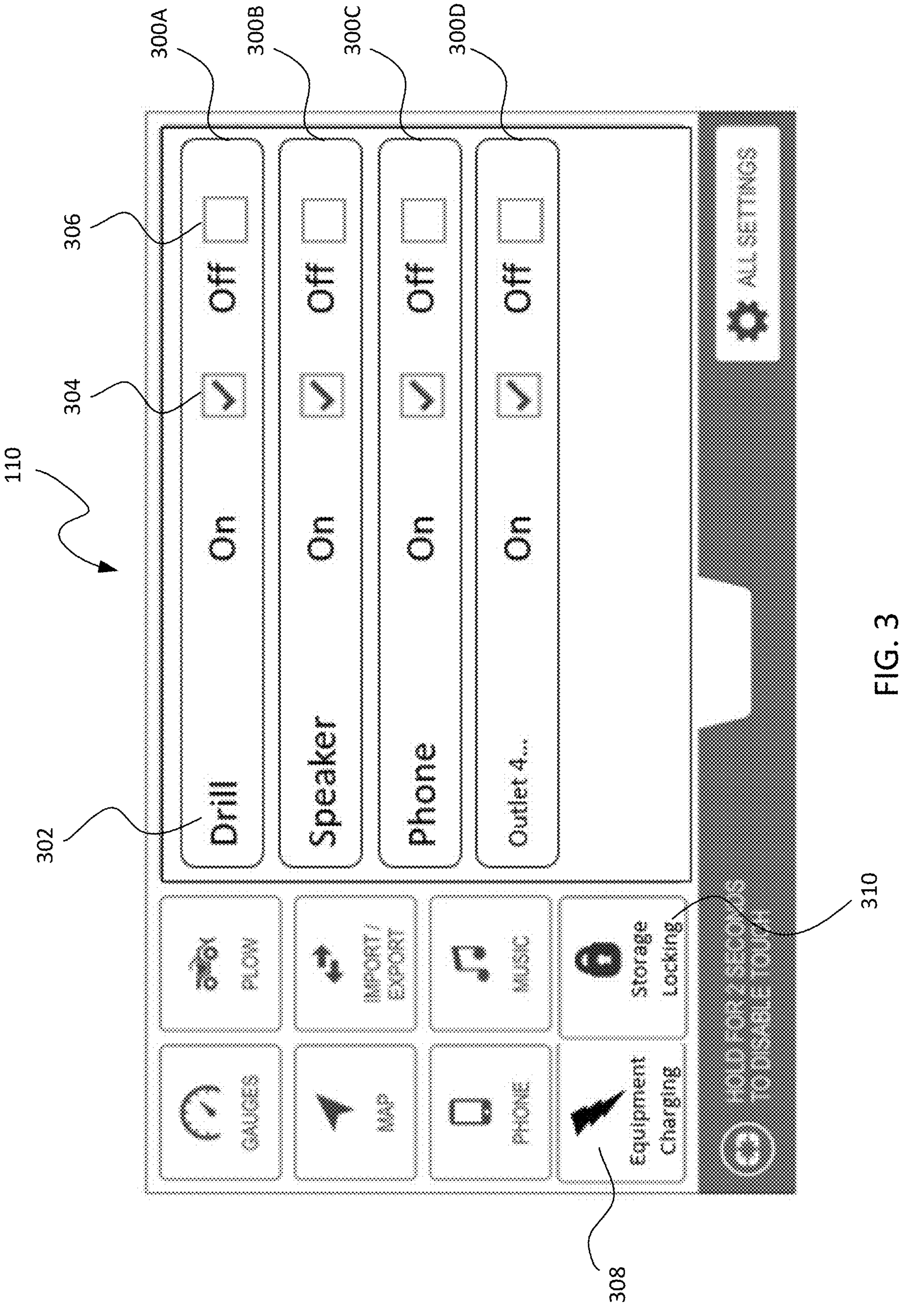
FIG. 3 illustrates an example user interface displaying an example screen layout, such as an identified accessory screen.
Figure 4:
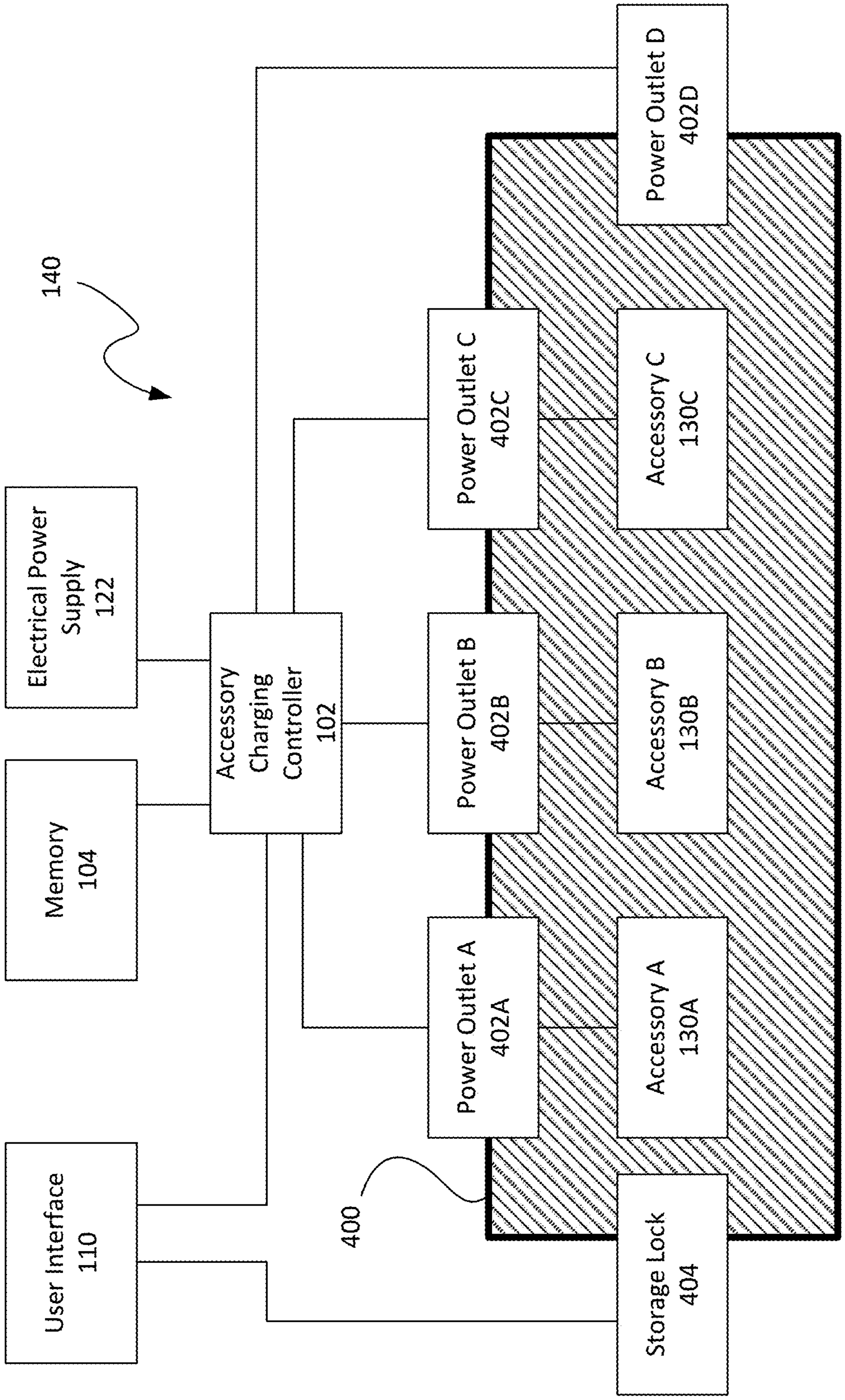
FIG. 4 is a representative view of an example accessory charging system of the vehicle of FIG. 1, including a chargeable storage.

References are made to FIGS. 3 and 4 in explaining the operation and functionality of user interface 110 in association with a chargeable storage 400, for example a storage compartment, accessory mount, or other device configured to retain or secure accessories 130. FIG. 3 illustrates an example of an image that may be displayed on user interface 110, according to some embodiments disclosed herein. FIG. 4 illustrates the accessory charging system 140, according to some embodiments disclosed herein.

User interface 110 includes a plurality of user-operable buttons (e.g., interactive buttons) which may be shown on a display of a computing device (for example, vehicle navigation system) installed on vehicle 100. The interactive buttons may be selected by hand if user interface 110 is and/or includes a touchscreen display, or by using a control knob coupled with the display. If a user presses, touches, and/or otherwise interacts with the interactive button, user interface controller 116 receives the user input indicating an interaction with the interactive button, and may causes display of another image on user interface 110, updates the image already displayed on user interface 110, or otherwise process the user input.

In some examples, user interface 110 displays a plurality of sections 300A, 300B, 300C, and 300D (collectively, sections 300) where each of sections 300 may be associated with an accessory 130. For example, charging controller 102 may detect accessory 130 when connected to accessory charging system 140. In some examples, sections 300 may be arranged in rows, columns, arrays, cells, blocks, windows, or image icons of any suitable shape and size. In some examples, sections 300 may be static. In other examples, sections 300 may be configurable by the user (e.g., moved and rearranged as preferred by the user). In the example shown, sections 300A-300D are arranged in rows, where each section is associated with a respective power outlet 402A-402B (collectively, power outlets 402). In other examples, any other number of sections may be implemented according to the number of power outlets 402 that are available in chargeable storage 400. Each of power outlets 402 is electrically coupled and controlled by accessory charging controller 102, such that the amount of electrical power provided thereto is controlled by accessory charging controller 102, which may in some examples be controlled by the user via user interface 110 as explained herein. Power outlets 402 may include any suitable electrical outlet, such as a 15 amp (A) through 30A and 120 volt (V) through 240 V outlet, a USB outlet, a smart outlet, a ground fault current interrupter outlet, an arch fault current interrupter outlet, or other electrical outlet.

Each of sections 300 in the user interface 110 includes an identifier subsection, e.g., identifier subsection 302, where an identifier (e.g., a name) of connected accessory 130 is displayed. The identifier subsection may show the identifier of the accessory that is plugged in to associated power outlets 402, and the identifier may be entered by the user while vehicle 100 is in motion or static. Each of sections 300 further include an "on" button 304 and an "off" button 306. The buttons 304 and 306 allow the user to manually turn on (activate) or shut off (deactivate) the electrical power provided to associated power outlets 402, thereby operating as a power switch for the individual accessory 130.

User interface 110 may further show a plurality of buttons to allow the user to switch between different modes. For example, the plurality of buttons may include an equipment charging button 308 and a storage locking button 310. Equipment charging button 308 may be a button that the user presses to see different sections 300 that represent the accessories 130 that are plugged in to the power outlets 402. Alternatively, equipment charging button 308 may function as a universal power switch. For example, pressing the button 308 may turn off all the power outlets 402. Such universal power switch may be advantageous when there is an urgent need for more electrical power for the operation of vehicle 100, such that accessory charging system 140 prevents the electrical power from being used to charge the accessories 130.

Storage locking button 310 may operate to lock or unlock a storage lock 404 of chargeable storage 400 in which accessories 130 are stored for charging. Storage lock 404 may be operated manually, for example, via a knob or physical switch by the user, as well as electrically via the user interface 110 using storage locking button 310 which provides an electrical signal to storage lock 404 to lock or unlock chargeable storage 400.

In some examples, storage lock 404 may be operated by one or more remote devices 206 via Bluetooth, near field communication, or other wireless connection to user interface 110. In this way, storage lock 404 may be operable based at least in part on a presence, e.g., proximity, of one or more remoted devices 206 to vehicle 100. In some examples, storage lock 404 may be configurable based on a predetermined permission associated with the one or more remote devices. For example, storage lock 404 may unlock based on a proximity of one or more remote device 206, and lock after a predetermined amount of time or after the one or more remote device 206 is out of range; immediately after the one or more remote device 206 is out of range or if vehicle 100 is started; or the like.

As shown in FIG. 4. the illustrative accessory charging system 140 includes three accessories (130A-130C) and four power outlets (402A-402D). However, it should be appreciated that, in some examples, any other number of accessories and power outlets may be implemented. In the illustrative example, one of the power outlets is unoccupied (e.g., power outlet D 402D) and such an occupancy status of the power outlet 402D is indicated on user interface 110 by displaying a default outlet identifier "Outlet 4 . . . " in section 300D. In some examples, when the user plugs in an accessory 130 to one of the power outlets 402, a message may be displayed to enter an identifier to identify the accessory 130 that was plugged in. The user may type in the identifier of the device, such as "Drill," "Speaker," "Phone," or other device identifier, and enter it to be displayed in the identifier subsection 302 of the section 300 that is associated with the accessory 130. The entered identifier may be stored in the memory 104, such that when the user plugs in the same accessory 130 again in the future, instead of having to type the entire identifier, a dropdown menu may appear with a list of suggested identifiers, most or all of which were previously entered in the user interface 110. In some examples, the dropdown menu may also include preinstalled default identifiers that were not previously entered but may be possible candidates for the identifier of the accessory 130. In some examples, accessory charging system 140 may be configured to display an identifier for an unoccupied power outlet, such as for example, "phone", "extra", "unused", or other predetermined or user configurable identifier.

In some examples, accessory charging controller 102 and/or user interface controller 116 may be configured to automatically identifying a connected accessory 130 by sensing a current or power consumption of the accessory 130 via media transfer protocol (MPT) or a wired or wireless communication protocol configured to enable device identification, such as Bluetooth, Wi-Fi, near field communication, or the like. In some examples, sensor 202 may include one or more accessory power/current consumption sensors that can detect a power usage, voltage drop, and/or current usage of the connected accessories. For example, the accessory power/current consumption sensor(s) may be operatively coupled to each accessory and may provide information indicating a power consumption of the accessory and/or an amount of current drawn by the accessory. The sensor(s) may be any type of sensor that detects the power usage and/or current usage of the connected accessories. The accessory power/current consumption sensor(s) may provide information indicating a power usage and/or a current usage of the accessory to user interface controller 116 via accessory charging controller 102. In some instances, the accessory power/current consumption sensor(s) may be included within accessory charging controller 102 and/or user interface controller 116, or otherwise connected directly thereto. In other words, accessory charging controller 102 and/or user interface controller 116 may detect the power/current consumption of the accessories. Additionally, or alternatively, sensor 202 may determine the voltage drop and/or current usage of the accessories and use the voltage drop and/or current usage to determine the power consumption of the accessories. Additionally, or alternatively, sensor 202 may receive a signal from a respective accessory when the respective accessory is plugged into one of power outlets 402. For example, the signal may be an MPT signal or other wired or wireless signal configured to identify the respective accessory.

Therefore, when the newly connected accessory has the same or similar power usage, current usage, or other identification signal as a previously identified accessory, accessory charging controller 102 and/or user interface controller 116 may automatically determine that the newly connected accessory is the same as the previously identified accessory based on this similarly. In such an example, user interface 110 may display a suggested identifier of the newly connected accessory (i.e., the identifier of the previously identified accessory) to the user for verification. Alternatively, if more than one previously identified accessory are determined, user interface 110 may provide the user, via the dropdown menu, with a reduced list of potential candidates for the identifier of the newly connected accessory by eliminating candidates that are associated with the power usage and/or current usage that is different from those of the newly connected accessory. As such, the user would not have to scroll through a long list of accessory identifiers to arrive at the correct identifier.

In the example shown, user interface 110 is shown on the display installed on vehicle 100, but in some examples, the same or similar user interface may be shown on a remote device 206, for example the smartphone or tablet computer of the user that is operatively connected (either via a cable or wirelessly) to accessory charging controller 102 via network controller 204 of vehicle 100. Remote device 206 may perform the same operations on its own user interface 110 as described herein, effectively functioning as a secondary display for vehicle 100. In some examples, user interface 110 shown on remote device 206 may be different from what is shown on the display of vehicle 100, such as the shapes, sizes, and/or arrangements of the sections or buttons in order to fit a smaller display screen of remote device 206.

In some examples, user interface 110 may be used to implement load shedding to increase a range of vehicle 100 by shutting off one or more of the power outlets 402. Alternatively, range applications may be implemented to determine which of power outlets 402 may need to be shut off to extend the vehicle range. In one example, when the user enters a destination information via user interface 110 of vehicle 100 or remote device 206, vehicle controller 200, or more specifically the location determiner thereof as well as other applications such as mapping and routing program preinstalled on vehicle controller 200 or accessible via network controller 204, may determine whether any of the power outlets 402 needs to be shut off in order for vehicle 100 to have enough state of charge to be able to reach the destination.

In some examples, chargeable storage 400 is a container with a storage compartment which may be placed at any location in vehicle 100 as deemed suitable. The container may be made of any suitable material, such as plastic, metal, wood, ceramic, or combinations thereof. In some examples, the container may be located in the back or front trunk of vehicle 100, built into the dashboard of vehicle 100, such as a glove compartment, located between the driver's seat and the passenger's seat, such as inside the armrest located in the center console of vehicle 100, or located near the backseat of vehicle 100, among other possible locations. In other examples, as discussed above, chargeable storage 400 may include an accessory mounting device or other device configured to retain or secure an accessory. Wherever the physical location of chargeable storage 400 may be, chargeable storage 400 is remotely controllable such that any of power outlets 402 and lock 404 may be activated or deactivated via the operation of user interface 110 of vehicle 100 or remote device 206. It is to be understood that, in some examples, power outlets 402 may be capable of receiving power from a connected accessory 130, for example a battery or a generator, to provide power for on-board electrical power supply 122 of vehicle 100, as suitable.

Figure 5:
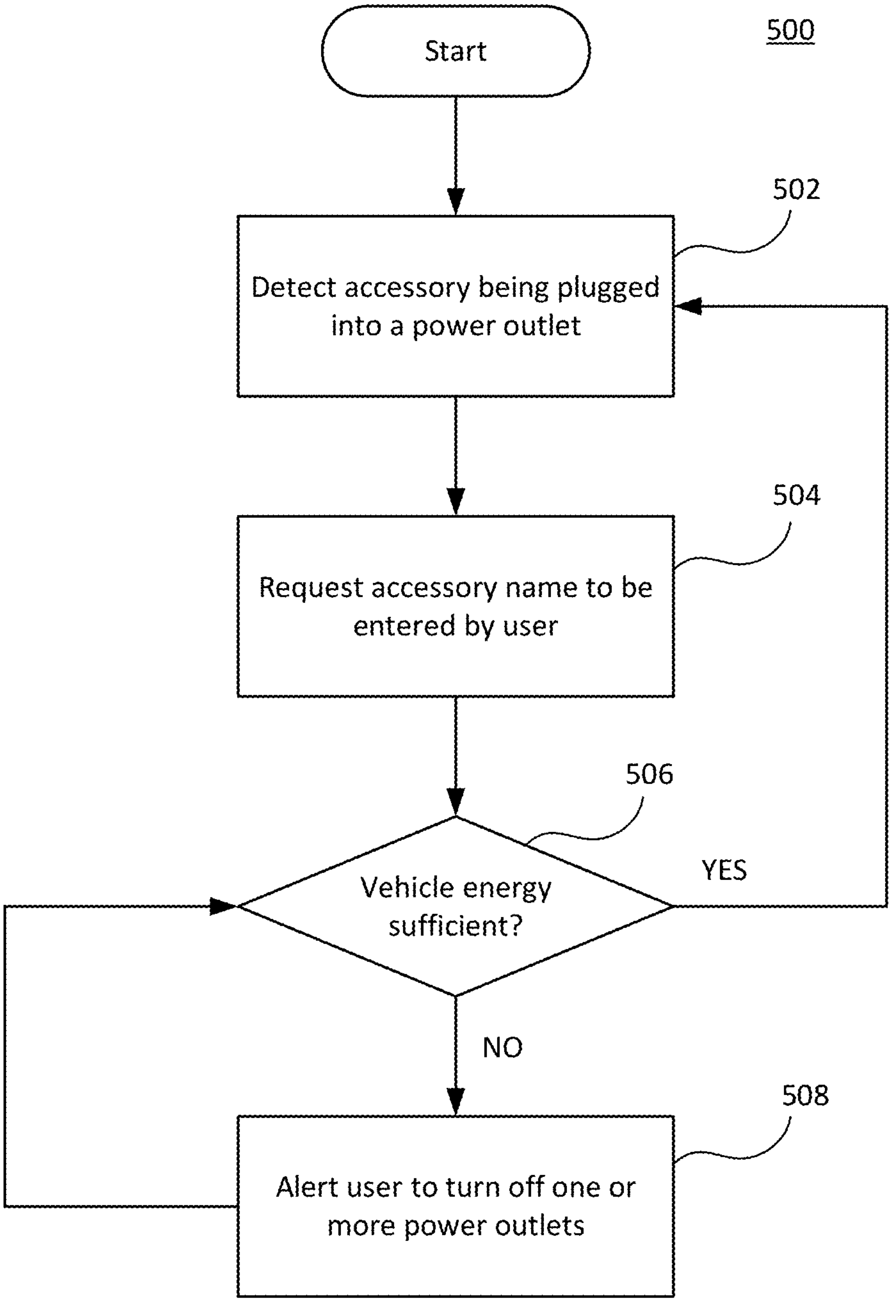
FIG. 5 illustrates an example flowchart for identifying one or more accessories and whether or not power outlets in the chargeable storage need to be deactivated.

FIG. 5 illustrates an example flowchart describing a processing sequence 500 for a controller (e.g., user interface controller 116. accessory charging controller 102, and/or vehicle controller 200) according to embodiments disclosed herein. In some examples, accessory controller 102 is configured to detect an identification of one or more accessories 130 and display, via user interface 110, an identifier associated with the identification of the one or more accessories 130. For example, in block 502, accessory charging controller 102 may detect an accessory 130 being plug into a power outlet 402. In some examples, a sensor, e.g., sensor 202, may receive from accessory 130 a signal indicative of an identification of accessory 130. In response to the detection, in block 504, accessory charging controller 102 may cause user interface controller 116 to display via user interface 110 a message requesting a user enter an identifier of the accessory 130. In some embodiments, the request may include a suggested (e.g., predetermined) identifier for the detected accessory 130 for user verification. Alternatively, the request may include a dropdown menu with suggested identifiers for the detected accessory 130 from which the user may select the appropriate identifier of the accessory 130. In some examples, accessory charging controller 102, in response to receiving a signal indicative of an identification of accessory 130, may cause user interface controller 116 to display on user interface 110 a predetermined identifier associated with the identification of accessory 130 (blocks 502 and 504).

In block 506, vehicle controller 200 and/or accessory charging controller 102 determines whether the vehicle's electrical energy storage device, e.g., electrical power supply 122, has sufficient electrical energy. The sufficient electrical energy may be determined by comparing a current state of charge of the energy storage device with a predicted state of charge that may be required in order to reach a destination entered by the user. For example, vehicle controller 200 and/or accessory charging controller 102 determines whether there is enough electrical energy stored within the energy storage device to arrive at a specified destination based on the specified destination and a minimally required amount of electric energy that is needed to complete the trip. The minimally required amount of electrical energy may be calculated by vehicle controller 200 or one of remote devices 206 that is connected with vehicle 100 through a network controlled by network controller 204. In some examples, the minimally required amount of energy may include a safety factor, such as an additional percentage of a total energy required to arrive at the specified destination.

If there is enough energy, the operation of the vehicle may proceed without further user interaction and the processing sequence 500 loops back to block 502 to continue detecting a new accessory 130 being plug into a power outlet 402. If, however, it is determined that there is not enough electrical energy, the sequence 500 proceeds to block 508, in which user interface controller 116 is configured to alert the user to turn off one or more of power outlets 402 to reduce the amount of electrical energy consumed by vehicle 100 to charge one or more accessories 130 that are plugged into one or more power outlets 402. Alternatively, user interface controller 116 may automatically cause accessory charging controller 102 to turn off one or more of power outlets 402.

In some examples, interface controller 116 may be configured to alert the user to turn off one or more of power outlets 402 or automatically cause accessory charging controller 102 to turn off one or more of power outlets 402 based on a prioritization of accessories 130. For example, the reduction of the amount of electrical energy consumed by vehicle 100 to charge one or more accessories 130 may involve predictively determining which one or more of the accessories 130 (if multiple accessories are connected to the vehicle 100) consumes the most power during charging and/or based on the importance or priority of each accessory. For example, if the accessories that are being charged include a smartphone, a battery-powered drill, and a battery-powered speaker, it may be predictively determined that the drill may consume the most power when it is left continuously charging. In some examples, each of the accessories may be assigned a value (which may be stored as a lookup table in the memory, for example) and ranked in terms of importance or priority based on its functions. For example, a smartphone may be ranked higher in terms of priority relative to the power tool or the speaker because it is an essential item to have charged in case a mishap involving vehicle 100 or if the user needs to use the smartphone to find the way to the destination. In some examples, the prioritization of each accessory may be determined or predefined by the user such that the user determines which accessories are more important to be kept charged.

Subsequent to block 508, the sequence 500 loops back to block 506 to determine if removing one or more power outlets 402 was sufficient in reducing the amount of power consumed by one or more of accessories 130 to allow vehicle 100 to reach the destination. If it is determined that one or more other accessories 130 are still consuming too much power, the message from block 508 may be shown again such that the user is prompted to turn off additional power outlets to save power. Alternatively, user interface controller 116 may automatically cause accessory charging controller 102 to turn off one or more additional power outlets 402. Otherwise, the operation of vehicle 100 may proceed without further user interaction, i.e., the processing sequence 500 may loop back to block 502 and repeat.

In some examples, determining whether the vehicle has sufficient energy in block 506 may depend on a power plan (also referred to as "priority"). The power plan may be selected by the user or include a predetermined priority based on identifications of accessories 130. Any number of selectable power plans may be implemented. For example, there may be three power plans: normal, saver, and ultra. The normal power plan permits the accessory to be kept charging regardless of battery level or accessory power consumption. The saver power plan allows the accessory to be kept charging until the vehicle engine turns off or the battery levels of the vehicle are below a threshold. The ultra-power plan allows the accessory to be charged until the vehicle engine turns off or the energy consumption by charging the accessory is too high.

Figure 6:
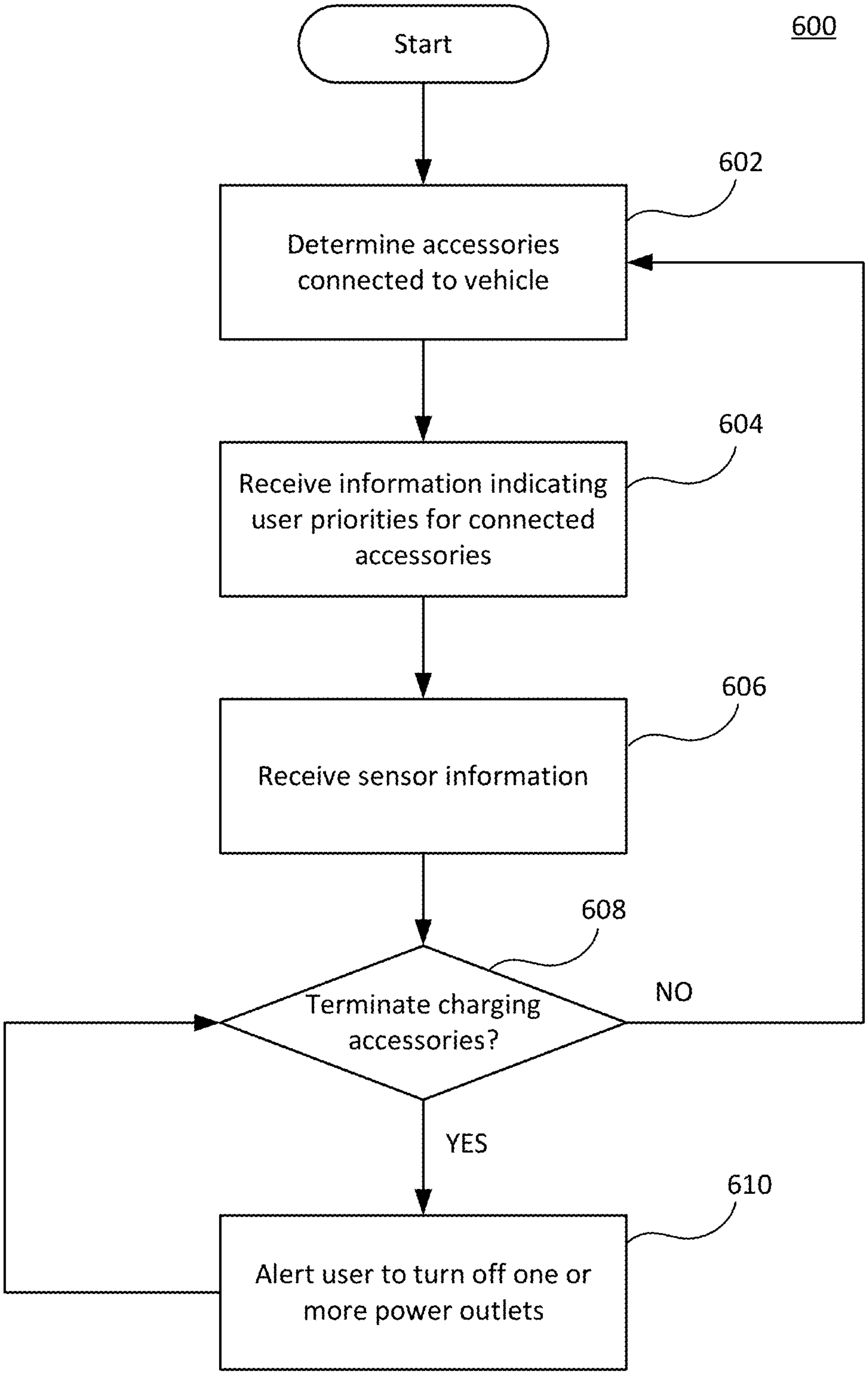
FIG. 6 illustrates another example flowchart for identifying one or more accessories and whether or not power outlets in the chargeable storage need to be deactivated.

FIG. 6 illustrates an example flowchart describing another processing sequence 600 for a controller (for example, the user interface controller 116, the accessory charging controller 102, and/or the vehicle controller 200) according to embodiments disclosed herein. In block 602, one or more accessories that are connected to the vehicle are identified, for example by automatically identifying them based on their power usage, current usage, or other wired or wireless signal as previously disclosed, or by having the user manually identify each one. Using the displayed image on user interface 110, the user may select a power plan for the accessory in block 604. In other words, based on the user interacting with the displayed image of user interface 110, user interface 110 receives a user input indicating a selected power plan (e.g., normal, saver, or ultra-power plan). The user interface 110 transmits the user input to user interface controller 116. As will be described further below, the user input indicating the selected power plan is used to determine whether to terminate and/or reduce power provided to the accessory.

It should be appreciated that, in the illustrative embodiment, only three example power plans and/or priorities are described above solely for brevity and clarity. However, additional types or concepts of power plans and/or priorities may also be used to determine whether to power on, turn off, and/or reduce power provided to the accessory. For example, user interface controller 116 may cause display of more or less than three priorities on user interface 110 for the user to select. Additionally, or alternatively, each of the priorities may include similar and/or different limitations than the normal, saver, and/or ultra-power plans described above, and may cause different limitations to terminate and/or maintain charging of their corresponding accessories.

As represented by block 606, user interface controller 116 receives sensor information. For example, the accessory charging controller 102 receives sensor information from multiple sensors 202, including an electrical power supply voltage sensor, an accessory power consumption sensor(s), and/or additional sensors coupled to vehicle 100. After receiving the sensor information, accessory charging controller 102 transmits the sensor information to user interface controller 116.

For example, the electrical power supply voltage sensor may provide information indicating a battery voltage (e.g., a state of charge of the electrical power supply 122) to user interface controller 116 via accessory charging controller 102. The electrical power supply voltage sensor may be operatively coupled to the electrical power supply 122 and may be any type of sensor that detects the state of charge of the electrical power supply 122. For example, the electrical power supply voltage sensor is a battery monitoring sensor that monitors and detects/determines a charge of the electrical power supply 122.

As represented by block 608, user interface controller 116 determines whether there is a need to terminate and/or reduce power provided to one or more connected accessories based on the sensor information (e.g., state of charge (SOC) of the electrical power supply, the engine speed, and power consumption due to charging the accessory) and the user priorities. If user interface controller 116 determines there is a need to terminate and/or reduce power provided to one or more connected accessories, the processing sequence 600 proceeds to block 610. If not, the processing sequence 600 loops back to block 602, and the process repeats.

In some examples, based on the user priorities indicating a normal power plan, a saver power plan, and an ultra-power plan, user interface controller 116 determines whether there is a need to terminate and/or reduce power to the connected accessories. For instance, if user interface controller 116 determines the accessories with a normal power plan, user interface controller 116 does not terminate and/or reduce power to the accessory regardless of accessory power consumption (e.g., power usage/current consumption) and/or electrical power supply level (e.g., the SOC of the electrical power supply). Additionally, or alternatively, based on determining that the vehicle engine is off (e.g., an engine speed sensor indicates the engine speed satisfies a threshold) and/or the electrical power supply level (e.g., SOC of the electrical power supply) satisfies (e.g., is below) a threshold, user interface controller 116 may terminate and/or reduce power to accessories that have a saver power plan. Additionally, or alternatively, based on determining that the vehicle engine is off and/or the accessory consumption (e.g., the power consumption and/or current consumption) satisfies (e.g., is above) a threshold, user interface controller 116 may terminate and/or reduce power to the accessories that have an ultra-power plan.

As represented by block 610, user interface controller 116 displays or sends a notification to alert the user to deactivate charging of one or more of the connected accessories 130 by turning off one or more of power outlets 402. Upon user selection, the selected power outlet or outlets is turned off. Alternatively, user interface controller 116 and/or accessory charging controller 102 may automatically turn off one or more of power outlets 402. After block 610, the processing sequence 600 may loop back to block 602 and repeat. It is to be understood that the notifications and/or alerts for the user may be visual, audio, or any other suitable form of notification/alert suitable for the user.

In some examples, if the engine speed satisfies a threshold (e.g., if the engine speed indicates the engine is off and/or below a threshold), then user interface controller 116 may suggest that the user terminate or reduce power provided to the accessories with an ultra-power plan and/or the saver power plan. In some instances, if the SOC of the electrical power supply satisfies a threshold (e.g., is below a threshold), then user interface controller 116 may suggest that the user terminate or reduce power provided to the saver power plan accessories. In some variations, if the accessory consumption (e.g., power/current consumption) satisfies a threshold (e.g., is above the threshold), then user interface controller 116 may suggest that the user terminate or reduce power to the ultra-power plan accessories.

In some examples, user interface controller 116 causes display of a prompt or indication of the power outlets that are suggested for termination. For example, if the "drill" (as shown in FIG. 3) has an ultra-power plan and user interface controller 116 determines the power consumption of charging the "drill" is greater than the threshold, then user interface controller 116 suggests to the user to terminate power provided to the power outlet associated with the drill. User interface controller 116 may then cause display a prompt indicating the power outlet associated with the drill has been turned off. User interface controller 116 may also provide a reason for turning off charging of the drill in the prompt (e.g., the power consumption of charging it was too high).

It should be appreciated that vehicle 100 may embodied as any vehicle, such as a two-wheel vehicle, a three-wheel vehicle, a four-wheel vehicle, and/or other multi-wheeled recreational vehicle that is used on roads, trails, and/or both. Some examples of the vehicles include, but are not limited to, motorcycles, all-terrain vehicles (ATVs), sport utility-type vehicles, side-by-side recreational vehicles, snowmobiles and utility vehicles. FIGS. 7-12 illustrate different embodiments of vehicle 100 that are configured to connect to different accessories and/or control (e.g., provide commands and/or power) the accessories. However, the vehicles shown in FIGS. 7-12 are non-exhaustive, and other types of vehicles are contemplated within this disclosure.

Figure 7:
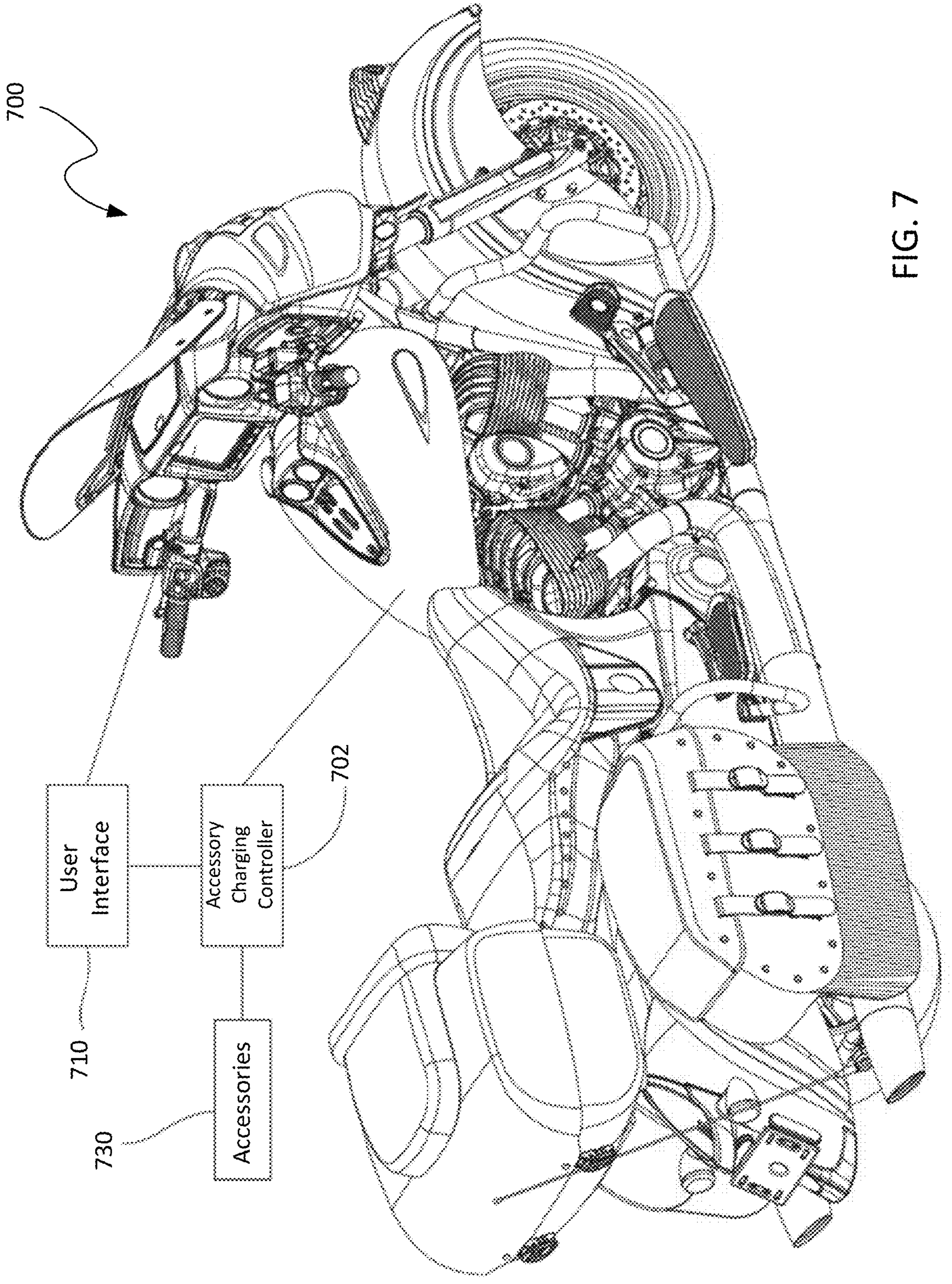
FIG. 7 is a front perspective view of another example vehicle, such as a two-wheeled vehicle.

FIG. 7 illustrates vehicle 700 as a two-wheeled vehicle, such as a motorcycle. The motorcycle 700 includes two ground engaging members (wheels). Further, the motorcycle includes a windshield and a user interface 710 (e.g., display). User interface 710 may be the same as or substantially similar to user interface 110 discussed above, expect for the differences described herein. For example, user interface 710 may include input devices (e.g., input devices 112, such as hard buttons and/or soft buttons), output devices (e.g., output devices 114, such as a display), a memory (e.g., memory 118) and/or a user interface controller (e.g., user interface controller 116) configured to receive input from the input devices and/or cause display of images on the output devices.

Figure 8:
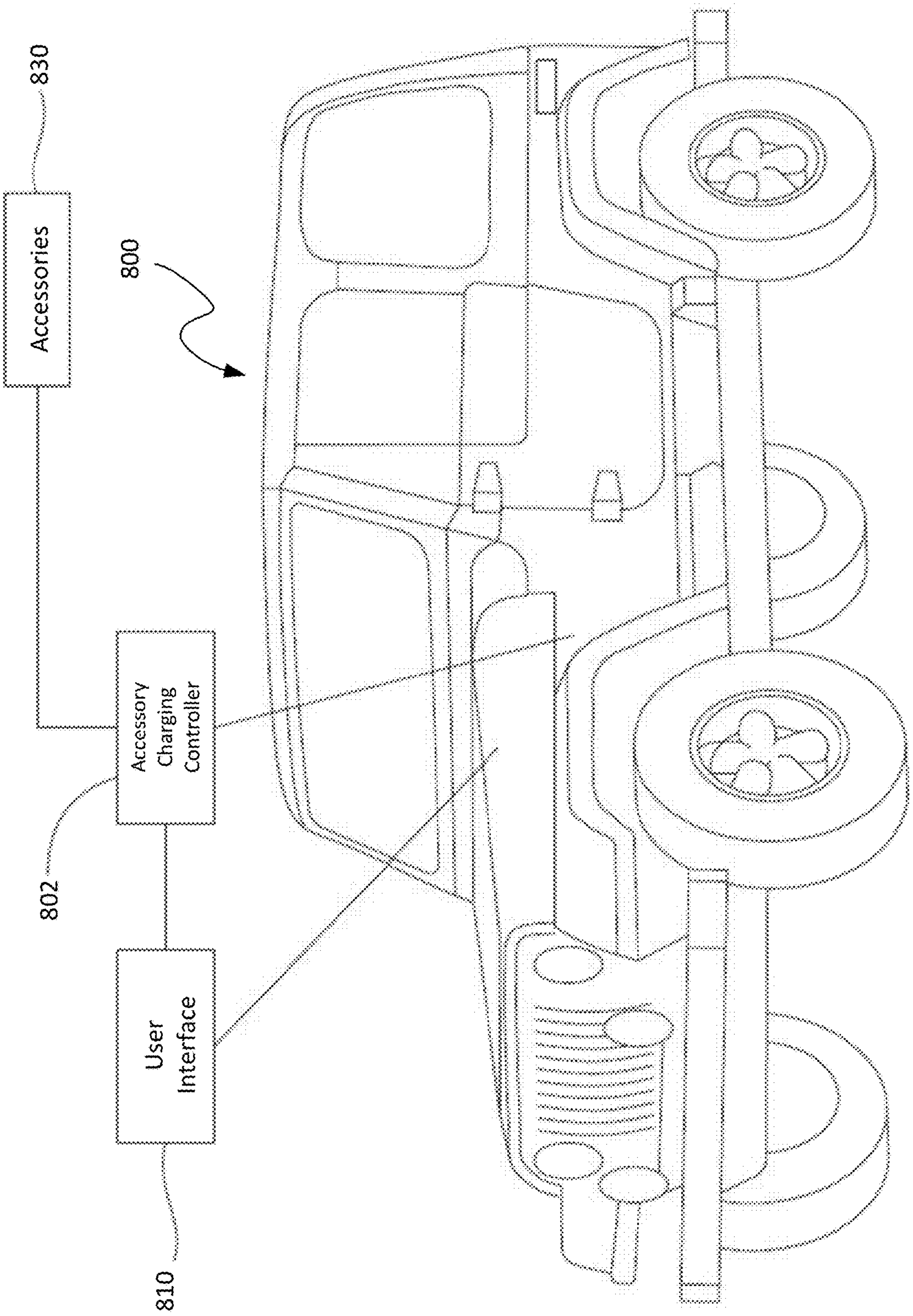
FIG. 8 is a front perspective view of another example vehicle, such as a four-wheeled vehicle.
Figure 9:
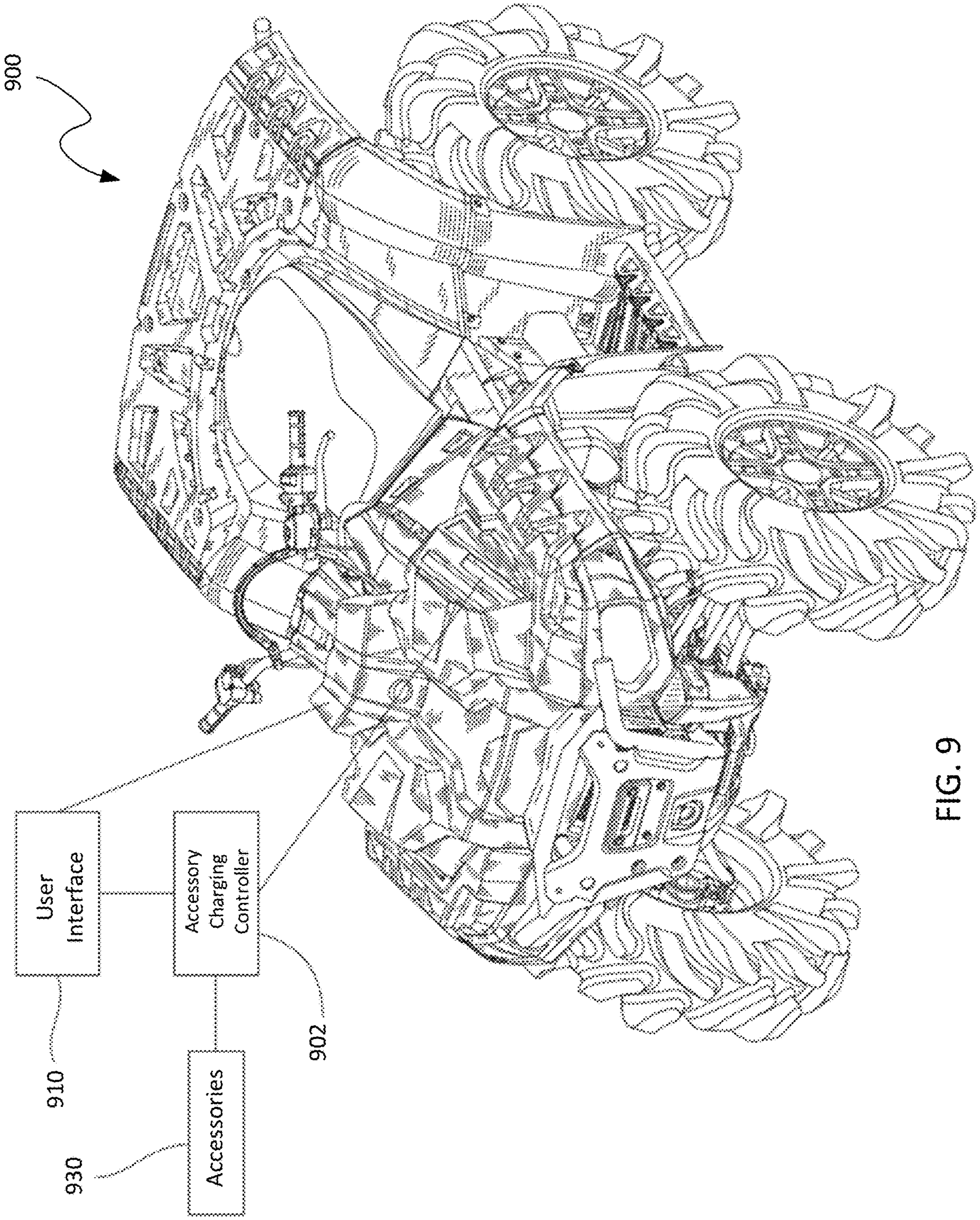
FIG. 9 is a front perspective view of another example vehicle, such as an all-terrain vehicle.
Figure 10:
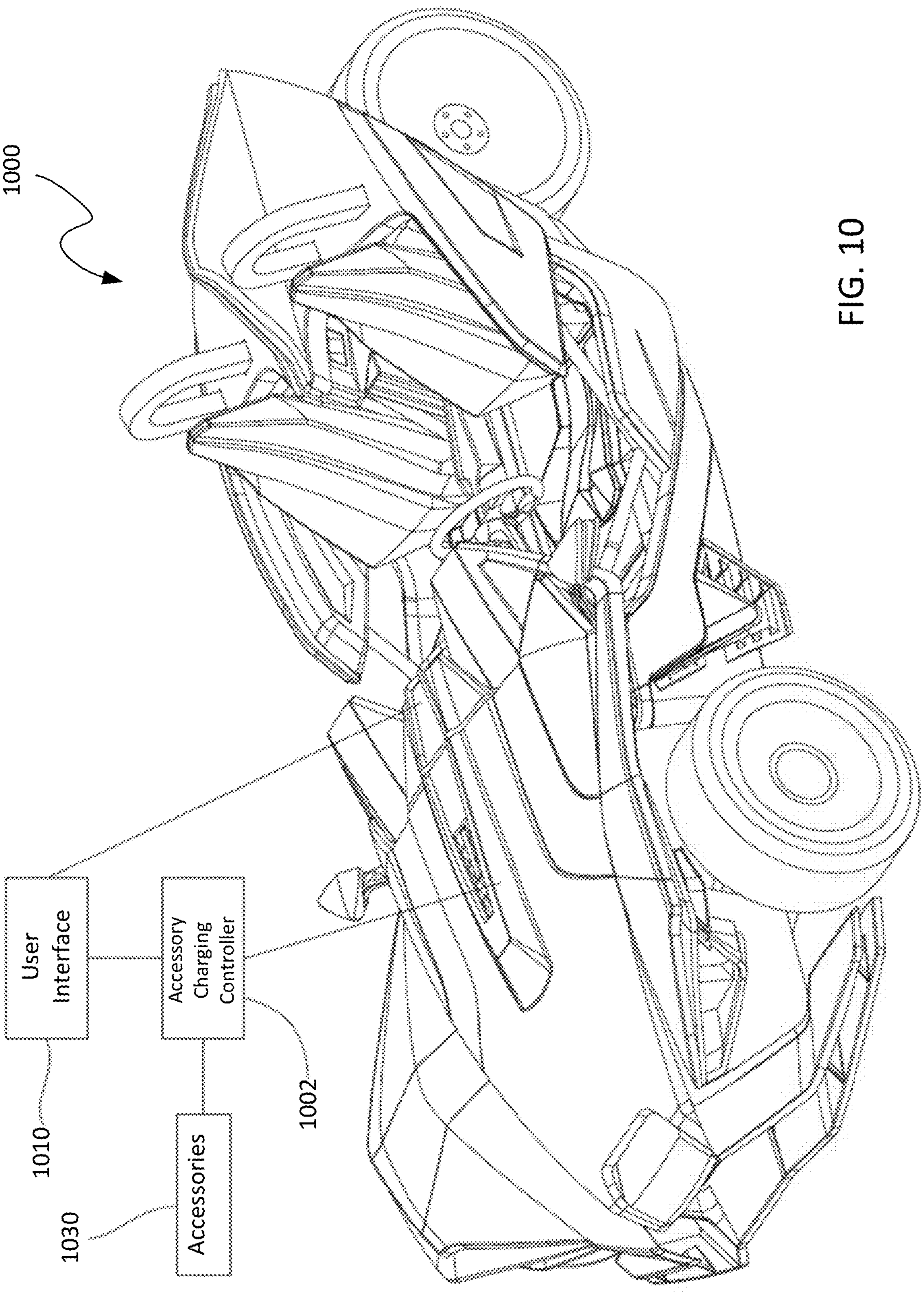
FIG. 10 is a front perspective view of another example vehicle, such as a three-wheeled vehicle.
Figure 11:
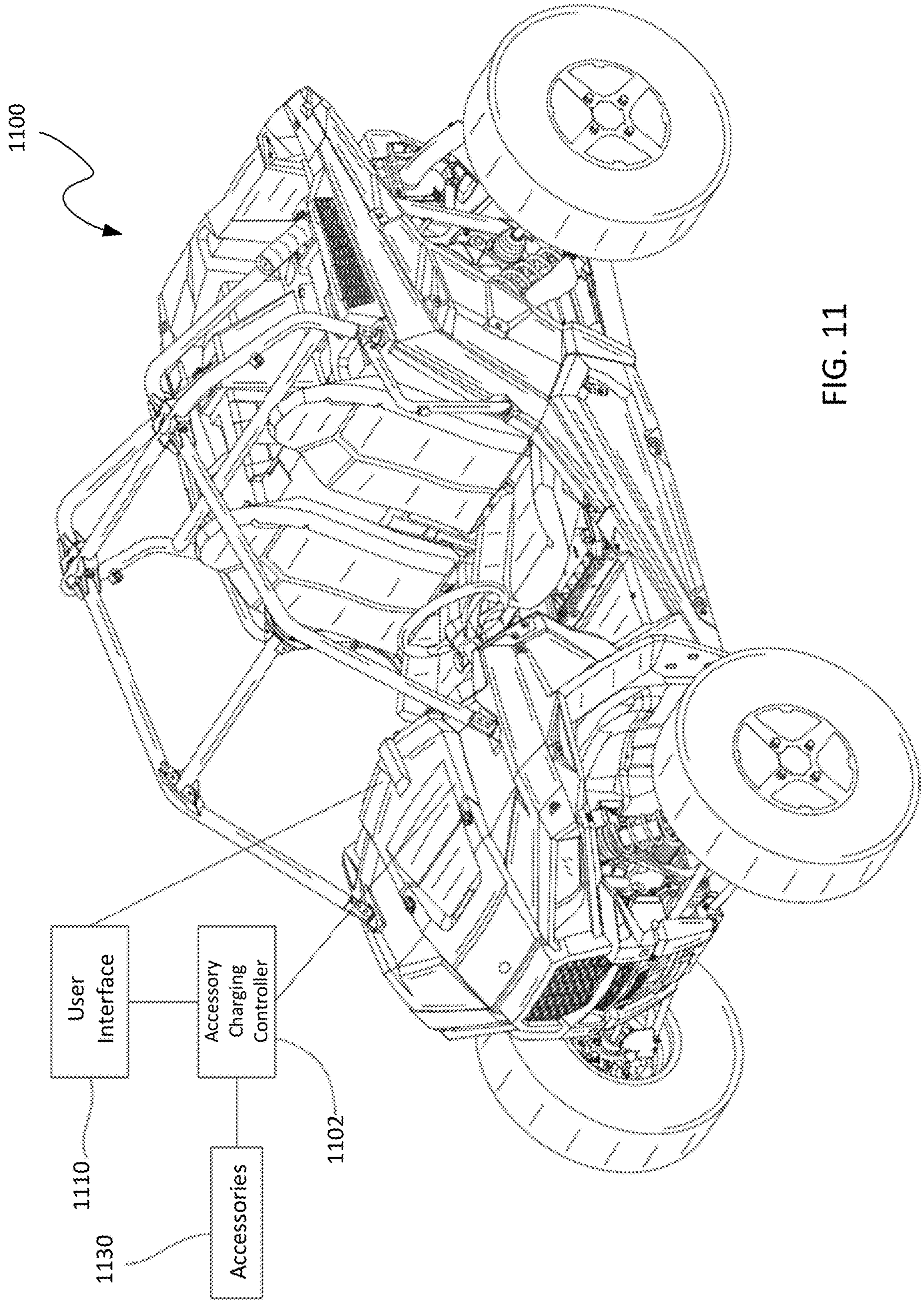
FIG. 11 is a front perspective view of another example vehicle, such as a utility vehicle.
Figure 12:
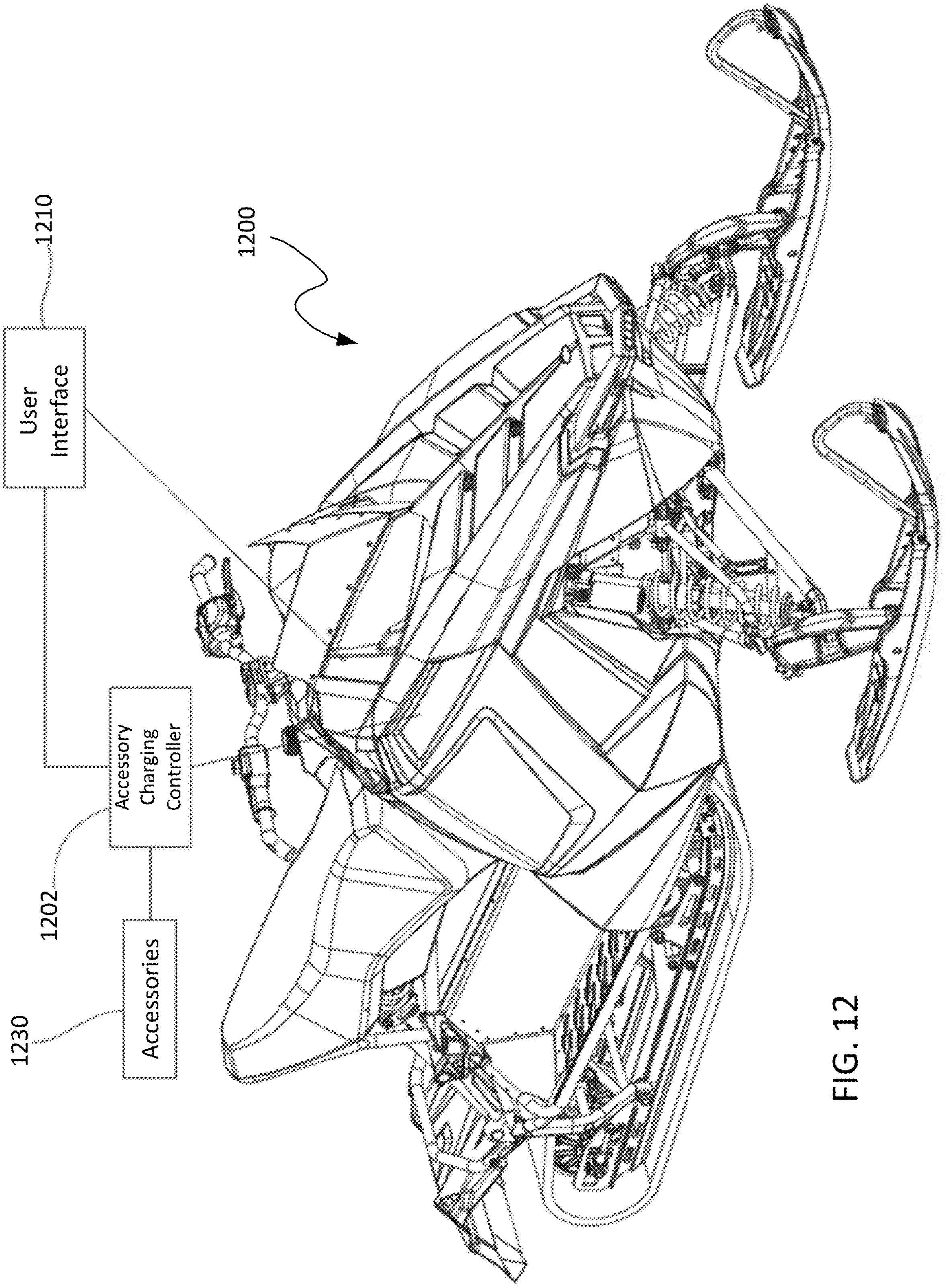
FIG. 12 is a front perspective view of another example vehicle, such as a snowmobile.

FIG. 8 illustrates a four-wheeled vehicle 800, such as a four-wheeled on-road and/or off-road vehicle. FIG. 9 illustrates an all-terrain vehicle (ATV) 900. FIG. 10 illustrates a three wheeled motorcycle type vehicle 1000, such as the POLARIS SLINGSHOT. FIG. 11 illustrates a four-wheel vehicle 1100, such as a utility vehicle. FIG. 12 illustrates a snowmobile 1200. Each of the vehicles 700-1200 shown in FIGS. 7-12 includes one or more user interfaces 710, 810, 910, 1010, 1110, and 1210, respectively. and accessory charging controller 702, 802, 902, 1002, 1102, and 1202, respectively, which may be connected to one or more accessories 730, 830, 930, 1030, 1130, and 1230, respectively. It should be appreciated that user interface 710, 810, 910, 1010, 1110, and 1210 may be the same as or substantially similar to user interface 110 discussed above, expect for the differences described herein. User interface 710, 810, 910, 1010, 1110, and 1210 may be the same as or substantially similar to user interface 110 discussed above, expect for the differences described herein. Accessory charging controller 702, 802, 902, 1002, 1102, and 1202 may be the same as or substantially similar to accessory charging controller 102 discussed above. expect for the differences described herein. Accessories 730, 830, 930, 1030, 1130, and 1230 may be the same as or substantially similar to accessories 130 discussed above, expect for the differences described herein. Additionally, or alternatively, a controller (e.g., a user interface controller 116 and/or an accessory charging controller 102) within the vehicles illustrated in FIGS. 7-12 may receive, control, and/or transmit information regarding the respective accessories. Additionally, or alternatively, the controller may also provide power to the respective accessories.

Additional details regarding the different types of vehicles illustrated in FIGS. 7-12 are provided in U.S. Pat. No. 8,827,019 (filed Dec. 18, 2013, titled SIDE-BY-SIDE VEHICLE). U.S. Pat. No. 9,211,924 (filed Mar. 25, 2014, titled SIDE-BY-SIDE VEHICLE), U.S. Pat. No. 8.544.587 (filed Mar. 21, 2012, titled THREE-WHEELED VEHICLE). U.S. application Ser. No. 15/387,504 (filed Dec. 21, 2016, titled TWO-WHEELED VEHICLE), U.S. Pat. No. 9,738,134 (filed Jun. 23, 2016, titled UTILITY VEHICLE), U.S. Pat. No. 9,809,195 (filed Nov. 22, 2013, titled SNOWMOBILE), and U.S. Pub. No. 2020/0198561 (filed Sep. 4, 2019, titled MANAGING RECREATIONAL VEHICLES AND ACCESSORIES), all assigned to the present assignee, the entire disclosures of which are expressly incorporated by reference herein.

This application is intended to cover any variations, uses, or adaptations of the present disclosure using its general principles. Further, this application is intended to cover such departures from the present disclosure as come within known or customary practice in the art to which the present disclosure pertains and which fall within the limits of the appended claims.

Furthermore, the connecting lines shown in the various figures contained herein are intended to represent functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements. The scope is accordingly to be limited by nothing other than the appended claims, in which reference to an element in the singular is not intended to mean "one and only one" unless explicitly so stated, but rather "one or more."

Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B or C may be present in a single embodiment; for example, A and B, A and C, B and C, or A and B and C.

Systems, methods and apparatus are provided herein. In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic with the benefit of this disclosure in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A vehicle comprising:

a user interface;

an electrical power supply configured to provide power to one or more removable accessories;

a chargeable storage including at least one power outlet electrically coupled with the electrical power supply, each of the at least one power outlet configured to receive one of the one or more removable accessories to provide electrical power thereto; and a controller operatively coupled to the user interface, the electrical power supply, and the chargeable storage, the controller configured to:

detect the one or more removable accessories that are connected to the at least one power outlet;

determine a list of two or more possible identifiers associated with each of the one or more detected removable accessories; and cause the user interface to display the list of possible identifiers associated with the one or more detected removeable accessories.

2. The vehicle of claim 1, wherein the controller is configured to receive, via the user interface, the identifier associated with each of the one or more detected removable accessories.

3. The vehicle of claim 1, further comprising at least one sensor configured to detect at least one of a state of charge of the electrical power supply or a power consumption for the electrical power supply when charging the one or more removable accessories, wherein the controller is further configured to determine, based on the state of charge of the electrical power supply, whether the state of charge of the electrical power supply is sufficient for the vehicle to arrive at a predetermined destination.

4. The vehicle of claim 3, wherein the controller is further configured to cause, in response to determination that the state of charge of the electrical power supply is not sufficient for the vehicle to arrive at the predetermined destination, the user interface to display a message alerting the user to turn off one or more of the at least one power outlet.

5. The vehicle of claim 3, wherein the controller is further configured to automatically turn off, in response to determination that the state of charge of the electrical power supply is not sufficient for the vehicle to arrive at the predetermined destination, one or more of the at least one power outlet.

6. The vehicle of claim 1, wherein the at least one power outlet is individually activatable and deactivatable by the user interface.

7. The vehicle of claim 1, wherein the controller is wirelessly coupled to a remote device, the remote device configured to display the user interface.

8. The vehicle of claim 3, wherein the controller is further configured to:

receive user input indicating at least one user priority from the user interface, receive sensor information from the at least one sensor, the sensor information including the state of charge of the electrical power supply or the power consumption for the electrical power supply when charging the one or more removable accessories, determine, based on the received sensor information and the at least one user priority, that one or more of the at least one power outlet needs to be deactivated, and cause the user interface to display a notification to deactivate the one or more of the at least one power outlet.

9. The vehicle of claim 1, further comprising an accessory current consumption sensor configured to detect a current consumption of each of the one or more removable accessories, wherein:

the controller is further configured to receive the current consumption of each of the one or more removable accessories; and to determine the list of two or more possible identifiers associated with each of the one or more removable accessories includes comparing the current consumption with one or more previously detected current consumptions.

10. The vehicle of claim 9, wherein to determine the list of two or more possible identifiers associated with each of the one or more detected removable accessories comprises to automatically select the identifier from the list of possible identifiers based on the current consumption.

11. The vehicle of claim 9, wherein to determine the list of two or more possible identifiers associated with each of the one or more detected removable accessories comprises to:

display the list of possible identifiers for the each of the one or more removable accessories on the user interface; and receive, via the user interface, the identifier from the list of possible identifiers.

12. The vehicle of claim 9, wherein the controller is further configured to:

determine a power consumption of charging the one or more removable accessories based on the current consumption, determine, based on the power consumption, that one or more of the at least one power outlet needs to be deactivated, and cause the user interface to display a notification to deactivate the one or more of the at least one power outlet.

13. The vehicle of claim 1, wherein the chargeable storage further comprises a storage lock that is activatable and deactivatable by the user interface.

14. A method for controlling charging of one or more removable accessories connected to an electrical power supply of a vehicle, comprising:

detecting the one or more removable accessories connected to at least one power outlet of a chargeable storage, the at least one power outlet coupled to the electrical power supply, each of the at least one power outlet configured to receive one of the one or more removable accessories to provide electrical power thereto;

determining a list of two or more possible identifiers associated with each of the one or more detected removable accessories; and causing a user interface to display the list of two or more possible identifiers associated with the one or more detected removeable accessories.

15. The method of claim 14, further comprising receiving, via the user interface, the identifier associated with each of the one or more detected removable accessories.

16. The method of claim 14, further comprising:

determining whether a state of charge of the electrical power supply is sufficient for the vehicle to arrive at a predetermined destination; and in response to determining that the state of charge of the electrical power supply is not sufficient for the vehicle to arrive at the predetermined destination, at least one of (i) causing the user interface to display a message alerting the user to turn off one or more of the at least one power outlet, or (ii) automatically turning off one or more of the at least one power outlet.

17. The method of claim 14, further comprising:

receiving at least one user priority via the user interface;

receiving a state of charge of the electrical power supply and power consumption for the electrical power supply by charging the one or more removable accessories;

determining, based on the received state of charge of the electrical power supply, the power consumption for the electrical power supply, and the at least one user priority, that one or more of the at least one power outlet needs to be deactivated; and causing the user interface to display a notification to deactivate the one or more of the at least one power outlet.

18. The method of claim 14, further comprising receiving a current consumption of each of the one or more removable accessories;

wherein determining the list of two or more possible identifiers associated with each of the one or more removable accessories includes comparing the current consumption with one or more previously detected current consumption, wherein a user selects the identifiers from the list.

19. The method of claim 18, further comprising:

determining a power consumption of charging the one or more removable accessories based on the current consumption;

determining, based on the power consumption, that one or more of the at least one power outlet needs to be deactivated; and causing the user interface to display a notification to deactivate the one or more of the at least one power outlet.

20. The method of claim 14, wherein the at least one power outlet is individually activatable and deactivatable by the user interface.

* * * * *